United States Patent [19]
Chi et al.

[11] 4,397,917
[45] Aug. 9, 1983

[54] FUEL CELL PACK WITH INTERNAL CONNECTION OF FUEL CELLS

[75] Inventors: Chang V. Chi, Brookfield; Andrei Leonida, Danbury, both of Conn.

[73] Assignee: Energy Research Corporation, Danbury, Conn.

[21] Appl. No.: 338,353

[22] Filed: Jan. 11, 1982

[51] Int. Cl.³ .................................... H01M 8/24
[52] U.S. Cl. ............................... 429/26; 429/36
[58] Field of Search ............... 429/36, 37, 26, 38, 429/39

[56] References Cited

U.S. PATENT DOCUMENTS

| | | | |
|---|---|---|---|
| 3,451,853 | 6/1969 | Spahrbier | 429/36 |
| 3,476,609 | 11/1969 | Gelting et al. | 429/36 |
| 3,515,593 | 6/1970 | Nickols | 429/36 |
| 3,833,424 | 9/1974 | Louis et al. | 429/36 |
| 4,233,369 | 11/1980 | Breault et al. | 429/36 |

Primary Examiner—Donald L. Walton

[57] ABSTRACT

A fuel cell pack comprising a plurality of fuel cells and means internal of said pack for holding the cells together.

26 Claims, 1 Drawing Figure

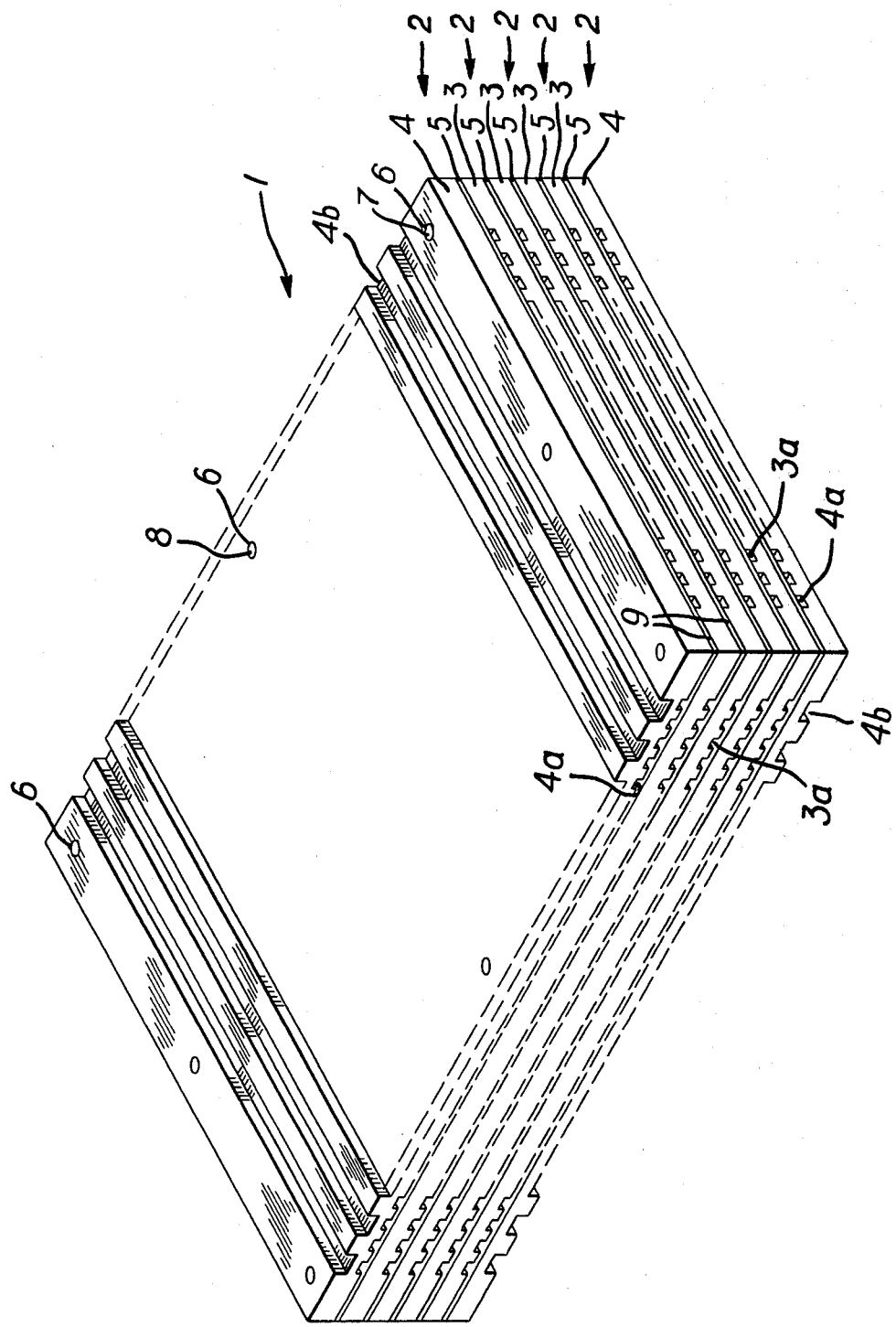

FUEL CELL PACK WITH INTERNAL CONNECTION OF FUEL CELLS

BACKGROUND OF THE INVENTION

This invention relates to fuel cells and, in particular, to fuel cells to be arranged in stack form.

In the design of fuel cell stacks, it would be advantageous if the fuel cells to be employed in the stack could be arranged in packs or units capable of independent handling. Fuel cell packs of this type would simplify the assembly procedure of an overall stack and, furthermore, would greatly facilitate maintenance and repair of the stack during operation.

One technique for providing individual fuel cell packs would be to use mechanical connectors external of the individual cells to connect the cells together much the same way as larger fuel cell stacks are now formed. However, this type of technique would require a significant number of mechanical connectors which would make the pack cumbersome, bulky and difficult to handle.

It is therefore an object of the present invention to provide a fuel cell pack which does not suffer from the above disadvantages.

It is a further object of the present invention to provide a fuel cell pack which is of relatively simple construction and which can be easily assembled with and disassembled from similar fuel cell packs.

SUMMARY OF THE PRESENT INVENTION

In accordance with the principles of the present invention, the above and other objectives are realized in a fuel cell pack comprising a plurality of fuel cells arranged in adjacent relationship and means internal of the pack for connecting the cells together.

By utilizing internal means for cell interconnection, the pack of the invention can be easily assembled with other packs to form a composite fuel cell stack. Furthermore, disassembly of the packs is now also facilitated so that individual cells can be repaired simply by removing their corresponding pack from the stack.

In the embodiment of the invention to be disclosed hereinafter various internal means for carrying out the invention are disclosed. In particular, both chemical means and mechanical means are described.

BRIEF DESCRIPTION OF THE DRAWINGS

The above and other features and aspects of the present invention will become more apparent upon reading the following detailed description in conjunction with the accompanying sole drawing which illustrates a fuel cell pack in accordance with the principles of the present invention.

DETAILED DESCRIPTION

In the FIGURE, a fuel cell pack 1 in accordance with the principles of the present invention is shown. The pack 1 comprises four bipolar plates 3 and two end cooling plates 4. The plates 3 have channels 3a in their opposing surfaces for carrying process gases. The plates 4, in turn, have channels 4a in their inner surfaces facing toward the pack for carrying such gases and channels 4b in their outer surfaces facing away from the pack for carrying cooling gases.

Sandwiched between adjacent plates are respective anode electrode, cathode electrode and electrolyte matrix composites 5 and possibly spacers or shims. Each composite along with its adjacent plates form a fuel cell 2 so that in the present case the pack 1 contains five cells.

In accordance with the invention, the pack 1 is further provided with means internal of the pack for connecting the fuel cells 2 together. More particularly, as illustrated, a plurality of through passages 6 extend through the stack and are adapted to receive either mechanical and/or chemical means for interconnecting the cells 2. Thus, a friction fitting plug 7 or other similar internal mechanical fastener such as, for example, a dowel pin, rivet, screw or bolt, may be inserted in the passages 6 to thereby hold the fuel cells together. Alternatively, a high-strength adhesive material 8 such as, for example, Chem-grip HT, may be situated in the passages 6 and cured therein to provide the interconnecting bond.

The internal connecting means may take other forms which can be used alone or in combination with the through passages 6 and connectors therein. In particular, the connecting means may be disposed between facing surfaces of selected adjacent elements in each cell and selected adjacent elements of successive cells. Thus, for example, high strength adhesive strips 9 can be placed on the peripheral areas of adjacent plates 3 and 4 to provide interconnection of the cells 2 similar to interconnection achieved with the passages 6. As mentioned, if desired for greater strength, the two forms of interconnecting means may be used.

With the cell pack 1 fabricated as above-described, the cell pack is free of external connectors which are often cumbersome and tend to obstruct operation. Furthermore, the pack can now be easily pretested and readily assembled with other pretested packs to form a composite fuel cell stack. Pretesting the packs provides an increased assurance of stack performance. In fact, the increased assurance can be made to approach that realizable by the testing of each cell individually which itself is impractical if not impossible to carry out.

The packs of the invention also facilitate testing of the composite stack since the packs can now be individually scanned to locate a problem area. Furthermore, maintenance and repair are also facilitated, since an inoperative pack, once located by scanning, can be removed from the stack and replaced by another pretested pack. A composite stack which otherwise might not have been salvagable is thus made so by utilization of the cell packs of the invention. Considerable savings in time, labor and expense is thus realized.

In all cases, it is understood that the abovedescribed arrangements are merely illustrative of the many possible specific embodiments which represent applications of the present invention. Numerous and varied other arrangements can readily be devised in accordance with the principles of the present invention without departing from the spirit and scope of the invention.

What I claim is:

1. A fuel cell pack comprising:
   a plurality of fuel cells arranged in adjacent relationship;
   a first cooling means following said cells and forming a first end of said pack;
   and means internal of said pack for holding said cells and said cooling means together.
2. A fuel cell pack in accordance with claim 1 wherein:

said pack has one or more passages extending therethrough;

and said internal means comprises connecting means disposed in one or more of said passages.

3. A fuel cell pack in accordance with claim 1 or 2 wherein:

said connecting means comprises a chemical.

4. A fuel cell pack in accordance with claim 3 wherein:

said chemical is a solidified chemical material.

5. A fuel cell pack in accordance with claim 3 wherein:

said chemical is a high-strength adhesive material.

6. A fuel cell pack in accordance with claim 1 or 2 wherein:

said connecting means comprises a mechanical means.

7. A fuel cell pack in accordance with claim 6 wherein:

said mechanical means comprises a cylindrical plug.

8. A fuel cell pack in accordance with claim 7 wherein:

said cylindrical plug comprises one of a dowel pin, a rivet, screw and a bolt.

9. A fuel cell pack in accordance with claim 1 or 2 wherein:

said connecting means comprises a chemical and a mechanical means.

10. A fuel cell pack in accordance with claim 2 wherein:

said internal means comprises further connecting means disposed between selected surface areas of adjacent cells.

11. A fuel cell pack in accordance with claim 10 wherein:

said further connecting means is a chemical.

12. A fuel cell pack in accordance with claim 11 wherein:

said chemical is a high strength adhesive.

13. A fuel cell in pack accordance with claim 10 wherein:

said surface areas border the peripheries of the respective cells.

14. A fuel cell pack in accordance with claim 1 wherein:

said internal means comprises a connecting means disposed between selected surface areas of adjacent cells.

15. A fuel cell pack in accordance with claim 14 wherein:

said connecting means is a chemical.

16. A fuel cell pack in accordance with claim 15 wherein:

said chemical is a high-strength adhesive.

17. A fuel cell pack in accordance with claim 14 wherein:

said surface areas border the peripheries of the respective cells.

18. A fuel cell pack in accordance with claim 1 wherein:

said first cooling means comprises a first cooling plate.

19. A fuel cell pack in accordance with claim 18 wherein:

said first cooling plate has a surface facing outward of said stack which is flat.

20. A fuel cell pack in accordance with claim 18 wherein:

said first cooling plate has a surface facing outward of said stack which has one or more channels for carrying a cooling gas.

21. A fuel cell pack in accordance with claim 18 wherein:

the fuel cell at said one end of said pack includes said cooling plate.

22. A fuel cell pack in accordance with claim 1 wherein:

said fuel cell pack further includes a second cooling means at the other end of said pack;

and said internal means holds said second cooling means to said cells.

23. A fuel cell pack in accordance with claim 22 wherein:

each of said first and second cooling means comprises a cooling plate.

24. A fuel cell pack in accordance with claim 23 wherein:

the fuel cells at said one and the other end of said pack include the cooling plates of said first and second cooling means, respectively.

25. A fuel cell pack in accordance with claim 23 wherein:

the surface of at least one of said cooling plates facing outward of said pack is flat.

26. A fuel cell pack in accordance with claim 23 wherein:

the surface of at least one of said cooling plates facing outward of said pack has channels for carrying a cooling gas.

* * * * *